US012779415B2

(12) United States Patent
Baron et al.

(10) Patent No.: US 12,779,415 B2
(45) Date of Patent: Nov. 3, 2026

(54) JET NOZZLE FOR POWDER HANDLING APPARATUS

(71) Applicant: Tetra Laval Holdings & Finance S.A., Pully (CH)

(72) Inventors: Antoine Baron, Cholet (FR); Blandine Malecot, Beaupréau (FR)

(73) Assignee: Tetra Laval Holdings & Finance S.A., Pully (CH)

(*) Notice: Subject to any disclaimer, the term of this patent is extended or adjusted under 35 U.S.C. 154(b) by 577 days.

(21) Appl. No.: 18/258,645

(22) PCT Filed: Dec. 20, 2021

(86) PCT No.: PCT/EP2021/086739

§ 371 (c)(1),
(2) Date: Jun. 21, 2023

(87) PCT Pub. No.: WO2022/136240

PCT Pub. Date: Jun. 30, 2022

(65) Prior Publication Data

US 2024/0033699 A1 Feb. 1, 2024

(30) Foreign Application Priority Data

Dec. 22, 2020 (EP) .................................... 20216366

(51) Int. Cl.
*B01F 35/10* (2022.01)
*B01F 27/70* (2022.01)
*B01F 101/06* (2022.01)

(52) U.S. Cl.
CPC .......... *B01F 35/1453* (2022.01); *B01F 27/70* (2022.01); *B01F 2101/06* (2022.01)

(58) Field of Classification Search
CPC .................................................. B01F 35/1453
(Continued)

(56) References Cited

U.S. PATENT DOCUMENTS 240,831 A * 5/1881 MacFarlane .... B01F 23/231265 137/13
2,563,130 A * 8/1951 Mylchreest ........... C03B 27/062 134/167 R
(Continued)

FOREIGN PATENT DOCUMENTS

CN 204159248 U 2/2015
CN 106000709 A 10/2016
(Continued)

OTHER PUBLICATIONS

English translation of EP 0232835 A2 (Year: 2026).*
(Continued)

*Primary Examiner* — David L Sorkin
(74) *Attorney, Agent, or Firm* — Renner, Otto, Boisselle & Sklar, LLP

(57) ABSTRACT

An apparatus for handling a food product powder includes a sealable container having an interior surface defining a volume in which the food product powder is handled, and a powder outlet. The apparatus includes a jet nozzle that is attached to the container and configured to feed air into the container and direct the air towards the interior surface to remove product powder from the interior surface, such that the air and the removed product powder may flow out of the container via the powder outlet. The jet nozzle includes a ceiling spray opening formed on a first side of the jet nozzle and directed towards a ceiling of the interior surface, and a side wall spray opening formed on a second side of the jet nozzle opposite the first side and directed towards a side wall of the interior surface.

12 Claims, 6 Drawing Sheets

(58) Field of Classification Search
USPC .................. 366/138; 134/22.18, 166 R, 171
See application file for complete search history.

(56) References Cited

U.S. PATENT DOCUMENTS

| | | | | | |
|---|---|---|---|---|---|
| 3,138,167 | A | | 6/1964 | Fisher | |
| 3,142,306 | A | * | 7/1964 | 071964 ..................... | B05B 1/14 134/166 R |
| 3,833,010 | A | * | 9/1974 | McDermott ............. | C11D 3/37 134/34 |
| 3,856,570 | A | * | 12/1974 | McDermott ............ | B08B 9/093 134/36 |
| 4,479,612 | A | * | 10/1984 | Umbach .................... | B01J 3/03 134/167 R |
| 4,859,249 | A | * | 8/1989 | Valentini ............... | B08B 9/0936 134/22.12 |
| 4,913,179 | A | * | 4/1990 | Engel ...................... | B01L 13/02 141/96 |
| 4,986,293 | A | * | 1/1991 | Schertenleib ........... | B08B 9/093 366/136 |
| 5,222,512 | A | * | 6/1993 | McGregor ............. | B65G 53/30 134/166 R |
| 5,613,510 | A | * | 3/1997 | Proctor ................... | B08B 9/093 406/146 |
| 5,865,536 | A | * | 2/1999 | Mechias ................ | A23G 1/125 426/660 |
| 6,213,134 | B1 | * | 4/2001 | Pike ........................ | B60S 3/008 134/169 R |
| 12,389,921 | B2 | * | 8/2025 | Skoglund ................. | A23C 9/16 |
| 2010/0186775 | A1 | | 7/2010 | Madsen | |
| 2022/0386638 | A1 | * | 12/2022 | Skoglund ................. | A23C 9/16 |

FOREIGN PATENT DOCUMENTS

| | | | | | |
|---|---|---|---|---|---|
| CN | 108940529 | A | | 12/2018 | |
| DE | 202004005049 | U1 | * | 6/2004 | .......... B01F 35/1453 |
| DE | 102013006822 | A1 | | 10/2014 | |
| EP | 0232835 | A2 | * | 8/1987 | ................ A61J 3/04 |
| EP | 0358120 | A2 | | 3/1990 | |
| EP | 2777831 | A1 | | 9/2014 | |
| EP | 3075459 | A1 | | 10/2016 | |
| GB | 142534 | A | | 4/1920 | |
| JP | H10165157 | A | | 6/1998 | |
| JP | 2014087759 | A | | 5/2014 | |
| WO | 2009083634 | A1 | | 7/2009 | |

OTHER PUBLICATIONS

English translation of DE 202004005049 U1 (Year: 2026).*
Extended European Search Report dated Jun. 17, 2021, for priority European Patent Application No. 20216366.3.
International Search Report mailed Apr. 21, 2022, for priority International Application No. PCT/EP2021/086739.

* cited by examiner

JET NOZZLE FOR POWDER HANDLING APPARATUS

TECHNICAL FIELD

The invention relates to an apparatus for handling a food product powder and to a method for cleaning an apparatus for handling a food product power.

TECHNICAL BACKGROUND

Food product powders may be used to produce various food products. Using such product powders are advantageous in that the powder may be stored for long periods of time without being spoiled, compared to liquid food products. The food powder may also be easily dissolved in a liquid to form the desired food product. Food products formed by powders may include dairy beverages, such as milk, non-dairy beverages, such as soft drinks, and other dairy products such as ice cream, yogurt, or cheese. Product powders may include raw materials such as sugar, milk powder, salt, or flour, and finished products such as instant formula, instant drinks, or dry broth. In producing a milk alternative that resembles fresh dairy milk, raw milk powder may be used. The raw milk powder dissolves easily in water to form a reconstituted liquid milk that may undergo further processing, including filtration, homogenization, and heat treatment, to form the final food product.

Product powders may require a mixing process which typically occurs in a sealable container including a stirring arrangement, paddle mixers, or other suitable mixing devices. After mixing occurs and the product mixture is removed from the sealable container, a residual powder may remain on the interior walls of the sealable container. A conventional method for cleaning the interior walls includes maintenance personnel manually removing the powder using compressed air. The conventional cleaning method is deficient in that the cleaning process is labor-intensive. The conventional cleaning method may also require opening the container, thereby causing the container interior to be susceptible to contamination.

SUMMARY

It is an object of the invention to at least partly overcome one or more limitations of the prior art. In particular, it is an object to more efficiently remove food product powder from an apparatus that is arranged to handle food product powder.

According to an aspect of the invention, an apparatus for handling a food product powder includes a sealable container having an interior surface defining a volume in which the food product powder is handled, and a powder outlet, and a nozzle that is attached to the sealable container and configured to feed air into the sealable container and direct the air towards the interior surface to remove product powder from the interior surface, such that the air and the removed product powder may flow out of the sealable container via the powder outlet. The jet nozzle includes a ceiling spray opening formed on a first side of the jet nozzle and directed towards a ceiling of the interior surface, and a side wall spray opening formed on a second side of the jet nozzle opposite the first side and directed towards a side wall of the interior surface.

Accordingly, the cleaning according to the invention is not done in the traditional way, i.e. by opening the container and manually using compressed air to remove the powder from the interior surface and out of the container. Instead, the powder is removed from the interior surface using the jet nozzle that directs the air towards different surfaces of the interior, such as the ceiling and side wall, and the removed powder and air may be drawn out of the container. The apparatus for handling a food product powder described herein is advantageous in that the apparatus enables cleaning in a very efficient and sanitary manner. The container may remain closed during the cleaning process. The apparatus may include more than one jet nozzle that is arranged to direct the flow of air towards different interior surfaces of the container. The arrangement of the jet nozzles is advantageous in ensuring that the powder is removed from the different interior surfaces of the container and directed to a location to be drawn out of the container.

According to another aspect of the invention, a method for cleaning is used for an apparatus for handling a food product powder that includes a sealable container having an interior surface defining a volume in which the food product powder is handled, and a powder outlet. The method includes feeding air into the sealable container using a jet nozzle that is attached to the sealable container, with the air being directed by the jet nozzle towards the interior surface to remove product powder from the interior surface, directing air towards a ceiling of the interior surface using a ceiling spray opening formed on a first side of the jet nozzle, and towards a side wall of the interior surface using a side wall spray opening formed on a second side of the jet nozzle opposite the first side, and drawing air out from the sealable container, such that air and the removed product powder may flow out of the sealable container via the powder outlet.

This method may include the same features as the apparatus for handling a food product powder and shares the same advantages.

Still other objectives, features, aspects and advantages of the invention will appear from the following detailed description as well as from the drawings.

BRIEF DESCRIPTION OF THE DRAWINGS

Features of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
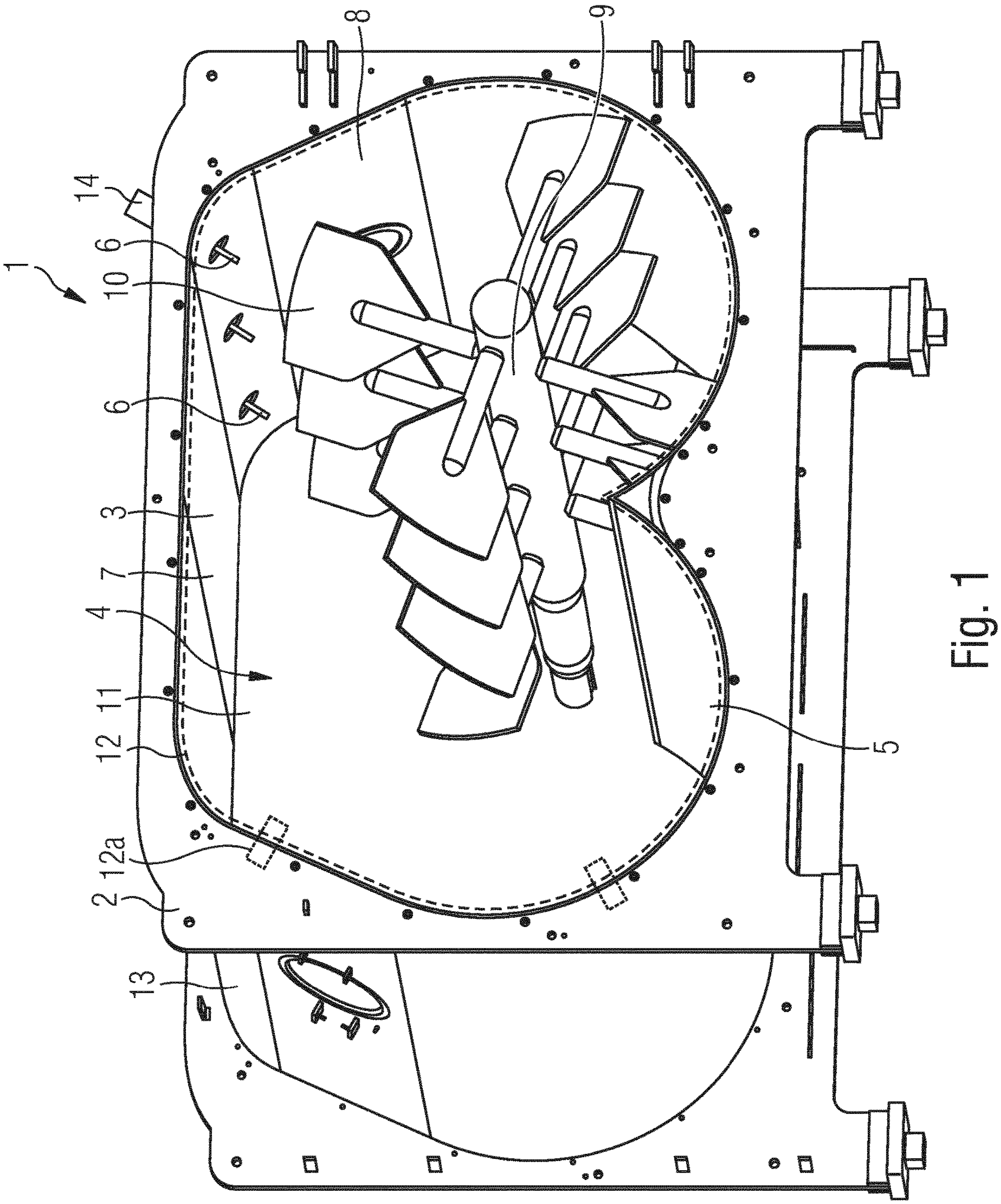
FIG. 1 is a front perspective view of an apparatus for handling a food product powder that includes a sealable container having an interior surface defining a volume in which the food product powder and a plurality of jet nozzles attached to the container and configured to feed air into the container.

With reference to FIG. 1, an exemplary apparatus 1 for handling a food product powder is shown. The apparatus 1 includes a sealable container 2 having an interior surface 3 that defines a volume 4 in which the food product powder is handled, and a powder outlet 5. The apparatus 1 may be oriented horizontally such that the powder outlet 5 is arranged at a bottom of the apparatus 1. One or more jet nozzles 6 are attached to the container 2 and are configured to feed air into the container 2 for removing residual food product powder from the container 2 during a cleaning process that occurs after a bulk of the food product powder is removed from the container 2. The bulk of the food product powder is removed from the container 2 for further processing to produce a food product. Each jet nozzle 6 is configured to direct the air towards different surfaces of the interior surface 3 to remove the product powder from the interior surface 3. The different surfaces include at least a ceiling 7 and a side wall 8. After the product powder is removed from the interior surface 3, the air and the removed product powder exit the container 2 via the powder outlet 5.

Handling the food product powder in the container 2 may include stirring or mixing the food product powder. The food product powder may be any combination of milk powder, sugar, salt, or flour, or powder mixtures such as infant formula, cake and baking mixtures and similar food product powders.

The apparatus 1 may be any apparatus that handles food product powder, such as a storage tank or mixers. In the illustrated example the apparatus 1 is a mixer. The apparatus 1 has then a rotatable stirring device 9, 10 for stirring or mixing the product powder mounted to a back wall 11 of the container 2. The rotatable stirring device 9, 10 extends through the volume 4 of the container 2 when the apparatus 1 is assembled. The rotatable stirring device 9, 10 may include one or more rotatable shafts 9 that include mixing paddles 10. If more than one rotatable shaft 9 is provided, the rotatable shafts 9 may be arranged to counterrotate relative to each other. The shape of the container 2 may be formed to accommodate rotation of the one or more rotatable shafts 9 and mixing paddles 10.

The interior surface 3 of the container 2 is defined by the side wall 8, the ceiling 7, the back wall 11, and a front wall arranged opposite the back wall 11. The front wall may be formed as a pivotable door 12. The door 12 may be attached to the container 2 via hinges and handles 12*a*. The ceiling 7 extends from the side wall 8 to another side wall 13 arranged opposite to the side wall 8, and between the back wall 11 and the door 12. The side walls 8, 13 may be angled relative to the ceiling 7 that is substantially planar and extends horizontally.

The jet nozzles 6 are mounted to the ceiling 7 of the container 2 at a portion of the container 2 at which the ceiling 7 transitions to the side wall 8. Each of the jet nozzles 6 are positioned to direct a flow of air towards one or more of the ceiling 7, the side wall 8, the rotatable stirring device 9, 10, and the door 12. An actuator 14 is connected to each jet nozzle 6 and configured to actuate the jet nozzle 6 by displacing the jet nozzle 6 along its axis to push it into the volume 4.

Any number of jet nozzles 6 may be provided and the arrangement of the jet nozzles 6 is dependent on the shape of the container 2. Between two and eight, or even more jet nozzles may be provided. Six jet nozzles 6 may be provided including one set of three jet nozzles 6 being arranged on the ceiling 7 proximate the side wall 8 and a second set of three jet nozzles 6 being arranged on the ceiling 7 proximate the opposite side wall 13. The two sets of jet nozzles 6 may be arranged tangentially relative to the ceiling 7 and angled inwardly toward a center of the container 2. Each jet nozzle 6 in a same set may have a same orientation. The jet nozzles 6 are arranged to ensure coverage of an entire area of the interior surface 3, such that product powder may be removed from the entire surface area of the interior surface 3.

Figure 3:
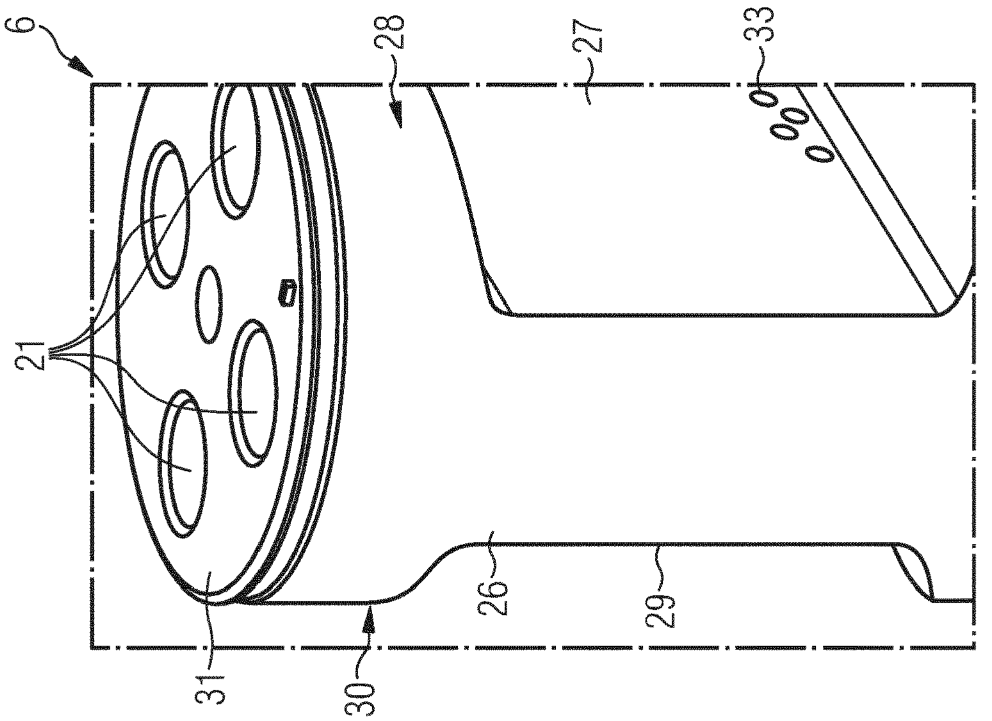
FIG. 3 is a side perspective view of one of the jet nozzles of FIG. 1 showing a ceiling spray opening.
Figure 2:
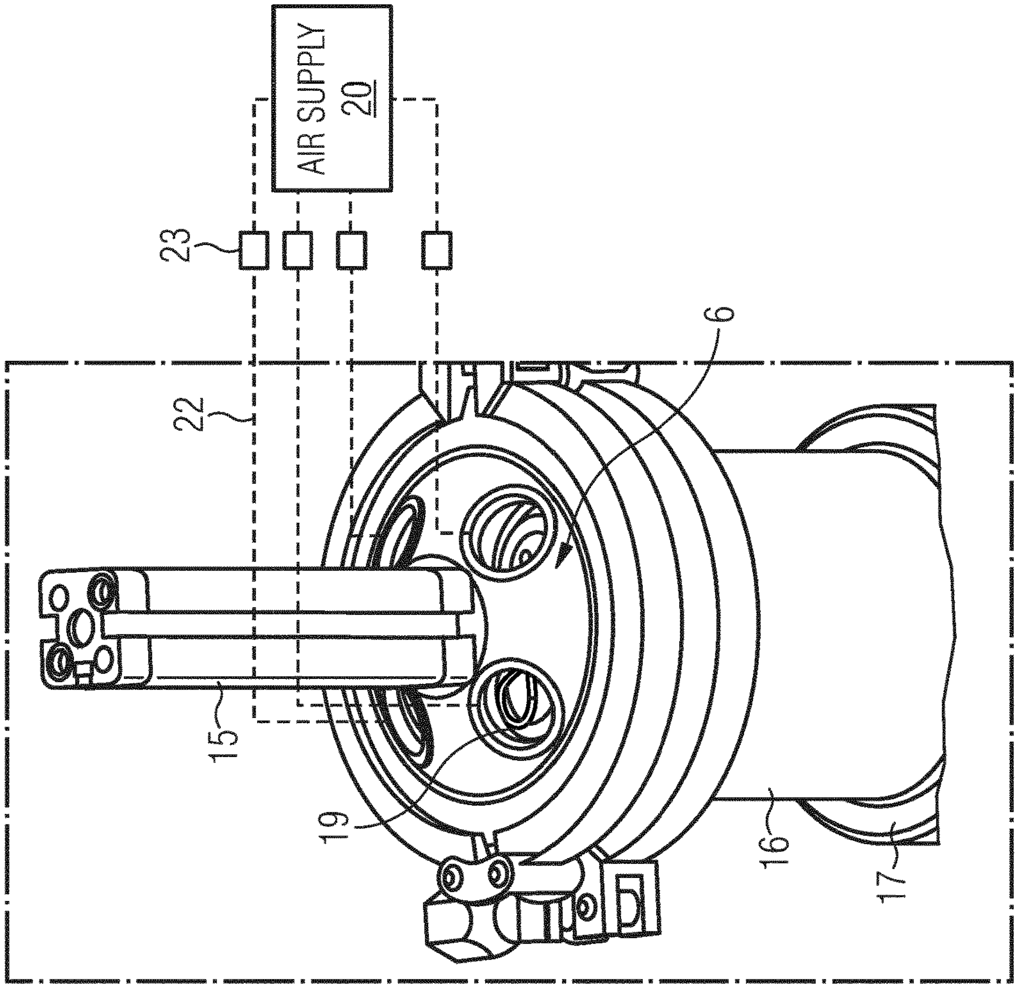
FIG. 2 is a side perspective view of one of the jet nozzles of FIG. 1.

FIG. 2 shows a stem 15 that is connected to the actuator 14 of FIG. 1 and to the jet nozzle 6. The jet nozzle 6 positioned in a housing 16 that is mounted to the container 2 via a flange 17 which may be welded to the housing 16. The jet nozzle 6 includes inlets 19 that are fluidly connected between an air supply 20 and inlets 21 of the jet nozzle 6, which are shown in FIG. 3. The air supply 20 may be a pressurized tank. Four inlets 19 may be provided for the jet nozzle 6. Fewer than four or more than four inlets may be provided and the number of inlets may correspond to the number of spray openings formed on the jet nozzle 6. Each inlet 19 may be connected to a respective fluid supply line 22 and a respective control valve 23 such that the air supply to each inlet 19 may be independently controlled. The control valves 23 may be solenoid valves or any other suitable control valve.

Figure 4:
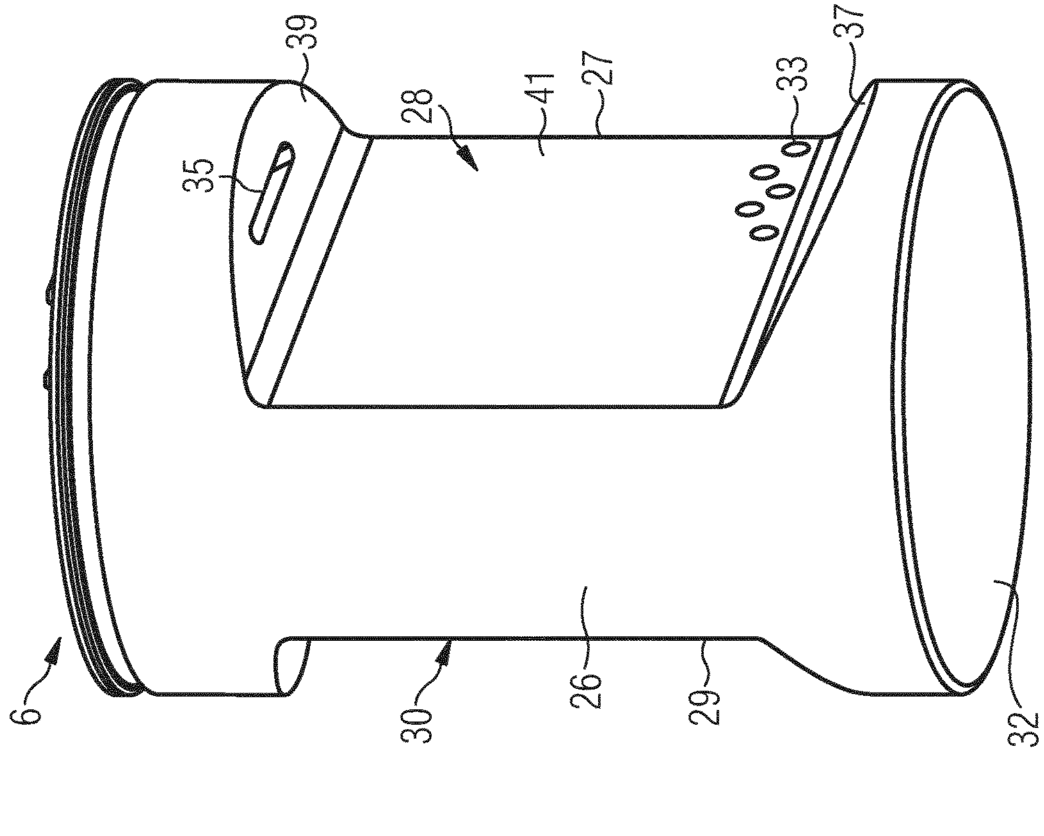
FIG. 4 is another side perspective view of the jet nozzle of FIG. 1 showing the ceiling spray opening and a shaft spray opening.

FIGS. 3 and 4 show the jet nozzle 6 having a cylindrical body 26 with a first cutout 27 formed in a first side 28 of the cylindrical body 26 and a second cutout 29 formed in a second side 30 of the cylindrical body 26 that is opposite the first side 28. The cylindrical body 26 includes a first end surface 31 that defines the inlets 21, as shown in FIG. 3 and a second end surface 32 that is opposite the first end surface 31, as shown in FIG. 4. When product powder is to be removed from the interior surface 3 of the container, the actuator 14 pushes the jet nozzle 6 into the volume 4 defined by the container 2 and air is fed through the jet nozzle 6. When the product powder has been removed from the interior surface 3, the actuator 14 retracts the jet nozzle 6 to a position in which the second end surface 32 is flush with the interior surface 3 of the container 2.

The jet nozzle 6 includes a ceiling spray opening 33 formed on the first side 28 of the jet nozzle 6 proximate the second end surface 32. When the jet nozzle 6 is attached to the container 2 and the jet nozzle 6 is actuated by feeding air into it when inside the volume 4, the ceiling spray opening 33 is directed towards the ceiling 7 of the interior surface 3 to direct air towards the ceiling 7 shown in FIG. 1.

Figure 5:
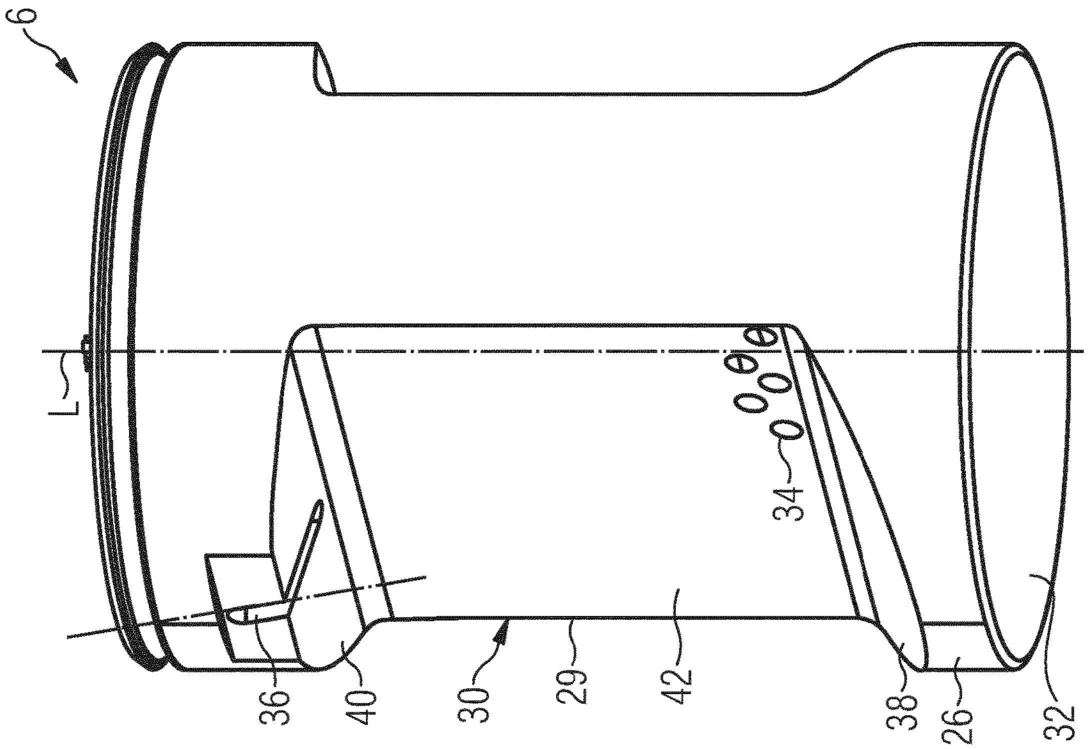
FIG. 5 is another side perspective view of the jet nozzle of FIG. 1 showing a side wall spray opening and a door spray opening.

FIG. 5 shows the jet nozzle 6 including a side wall spray opening 34 formed on the second side 30 of the jet nozzle 6 proximate the second end surface 32. When the jet nozzle 6 is actuated, the side wall spray opening 34 is directed toward the side wall 8 to direct air toward the side wall 8 shown in FIG. 1. The ceiling spray opening 33 and the side wall spray opening 34 are offset relative to a center of the respective first side 28 and second side 30. The ceiling spray opening 33 and the side wall spray opening 34 are offset in opposite radial directions such that the ceiling spray opening 33 and the side wall spray opening 34 are positioned opposite relative to each other on the cylindrical body 26.

As shown in FIG. 4, the jet nozzle 6 may also include a shaft spray opening 35 that is directed downwardly toward the rotatable stirring device 9, 10 (shown in FIG. 1). The shaft spray opening 35 is configured to provide a fan-shaped spray pattern and may be formed on the first side 28 of the jet nozzle 6 above the ceiling spray opening 33. As shown in FIG. 5, the jet nozzle 6 may include a door spray opening 36 that is directed towards the door 12 of the container 2 (shown in FIG. 1). The door spray opening 36 is inclined relative to a longitudinal axis L of the cylindrical body 26 and may be formed on the second side 30 of the jet nozzle 6 above the side wall spray opening 34.

Advantageously, the spray openings 33, 34, 35, 36 are formed in a same unitary cylindrical body 26 of the jet nozzle 6 such that one jet nozzle 6 is able to direct air at different surfaces of the interior of the container 2. Each of the ceiling spray opening 33, the side wall spray opening 34, the shaft spray opening 35, and the door spray opening 36 may be configured to provide different flow rates and different flow patterns.

In operation, when the stem 15 shown in FIG. 2 is actuated to push the jet nozzle 6 into the volume 4 of the container 2, the jet nozzle 6 is displaced relative to the housing 16 that is secured to the container 2. The jet nozzle 6 then extends out of the housing 16 and into the volume 4 of the container 2 to enable passage of air from the air supply 20 through the jet nozzle 6 into the container 2. The jet nozzle 6 may be displaced to a position in which the ceiling spray opening 33 and the side wall spray opening 34 are spaced between 50 and 60 millimeters from the interior surface 3 of the container 2. When the jet nozzle 6 is retracted by the stem 15, the jet nozzle 6 is moved back into the housing 16 such that the housing 16 blocks the spray openings 33, 34, 35, 36.

Figure 6:
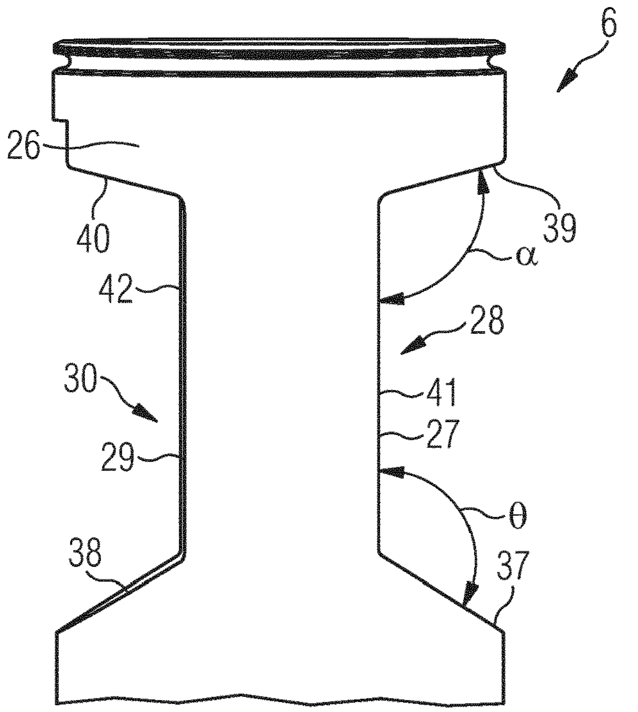
FIG. 6 is a side view of the jet nozzle of FIG. 1 showing the jet nozzle having a cylindrical body with cutouts on opposing sides of the jet nozzle.

FIG. 6 shows each of the first cutout 27 and the second cutout 29 including an upwardly directly directed surface 37, 38, a downwardly directed surface 39, 40, and a side surface 41, 42 that extends between the upwardly directly directed surface 37, 38 and the downwardly directed surface 39, 40. The side surface 41, 42 may be substantially planar. The upwardly directed surfaces 37, 38 and the downwardly directed surfaces 39, 40 are angled relative to the side surface 41, 42. Each upwardly directed surface 37, 38 may be angled at an angle θ that is greater than an angle α at which each downwardly directed surface 39, 40 is angled relative to the side surface 41, 42. The angle θ may be between 110 and 130 degrees and the angle α may be between 100 and 120 degrees. The upwardly directed surfaces 37, 38 may be angled at the same angle θ and the downwardly directed surfaces may be angled at the same angle α.

As shown in FIG. 4, the ceiling spray opening 33 may be formed on the side surface 41 of the first side 28 of the jet nozzle 6 proximate the upwardly directed surface 37 of the first side 28. The ceiling spray opening 33 may be formed to be offset relative to the center of the side surface 41. The shaft spray opening 35 may be formed on the downwardly directed surface 39 of the first side 28 of the jet nozzle 6. The shaft spray opening 35 may be centered or nearly centered on the downwardly directed surface 39.

As shown in FIG. 5, the side wall spray opening 34 may be formed on the side surface 42 of the second side 30 proximate the upwardly directed surface 38 of the second side 30. The side wall spray opening 34 may be formed to be offset relative to the center of the side surface 42. The door spray opening 36 may be formed on the downwardly directed surface 40 of the second side 30 of the jet nozzle 6. The door spray opening 36 may be centered or nearly centered on the downwardly directed surface 40. Other configurations of the ceiling spray opening 33, the side wall spray opening 34, the shaft spray opening 35, and the door spray opening 36 may be possible.

Figure 7:
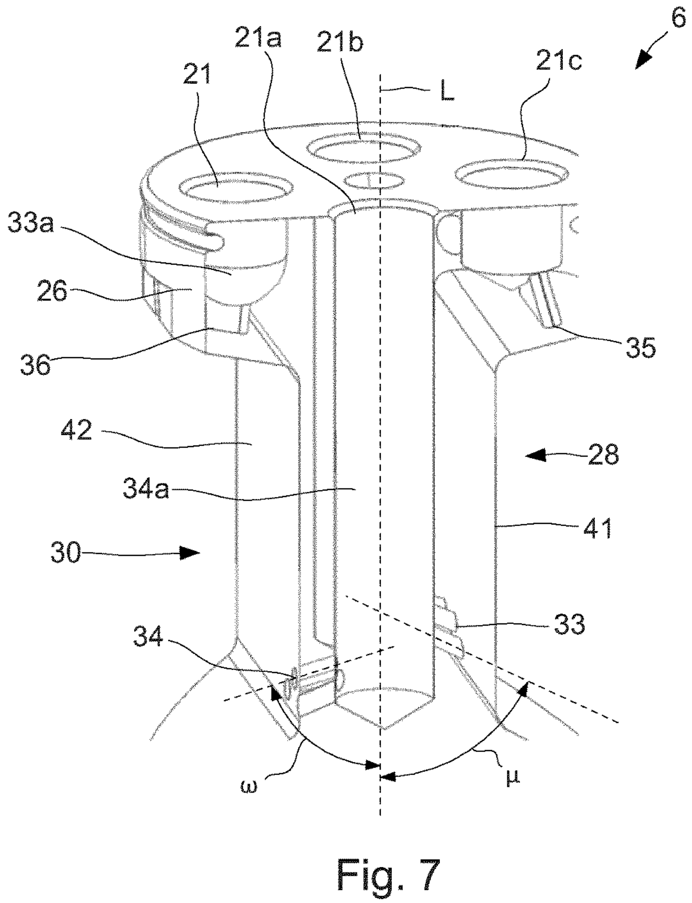
FIG. 7 is a cross-sectional view of the jet nozzle of FIG. 1 showing the ceiling spray opening, side wall spray opening, shaft spray opening, and door spray opening.

FIG. 7 shows a cross-sectional view of the cylindrical body 26 including the ceiling spray opening 33, the side wall spray opening 34, the shaft spray opening 35, and the door spray opening 36. Each of the door spray opening 36, the ceiling spray opening 33, the side wall spray opening 34, and the shaft spray opening 35 is fluidly connected to a corresponding one of the inlets 21, 21*a*, 21*b*, 21*c*. The inlets 21, 21*a*, 21*b*, 21*c* are fluidly connected to the door spray opening 36, the ceiling spray opening 33, the side wall spray opening 34, and the shaft spray opening 35, respectively.

The ceiling spray opening 33 may include a plurality of openings that are arranged proximate each other and directed in different directions. The ceiling spray openings 33 are defined by cylindrical fluid passages that extend from a fluid passage 33*a* that is connected to the fluid inlet 21*a* and extends parallel to the longitudinal axis L. The cylindrical fluid passages of the ceiling spray openings 33 extend through the cylindrical body 26 of the jet nozzle 6 to the side surface 41. Between three and seven openings may be provided. Five openings may be provided. Each opening of the ceiling spray openings 33 may be angled at a different angle μ relative to the longitudinal axis L and the ceiling spray openings 33 are angled downwardly. A mean angle μ for the set of ceiling spray openings 33 may be approximately 80 degrees, such that some of the ceiling spray openings 33 may be angled relative to the longitudinal axis L at angles that are larger than the mean angle μ and some of the ceiling spray openings 33 may be angled at angles that are smaller than the mean angle μ.

The side wall spray opening 34 may also include a plurality of openings that are arranged proximate each other directed in different directions. The side wall spray openings 34 are defined by cylindrical fluid passages that extend from a fluid passage 34*a* that is connected to the fluid inlet 21*b* and extends parallel to the longitudinal axis L. The cylindrical fluid passages of the side wall spray openings 34 extend through the cylindrical body 26 of the jet nozzle 6 to the side surface 42. Between three and seven openings may be provided. Five openings may be provided. Each opening of the ceiling spray openings 33 may be angled at a different angle ω relative to the longitudinal axis L and the side wall spray openings 34 are angled downwardly. A mean angle μ for the set of ceiling spray openings 33 may be approximately 80 degrees, such that some of the side wall spray openings 34 may be angled relative to the longitudinal axis L at angles that are larger than the mean angle ω and some of the side wall spray openings 34 may be angled at angles that are smaller than the mean angle ω.

Figure 8:
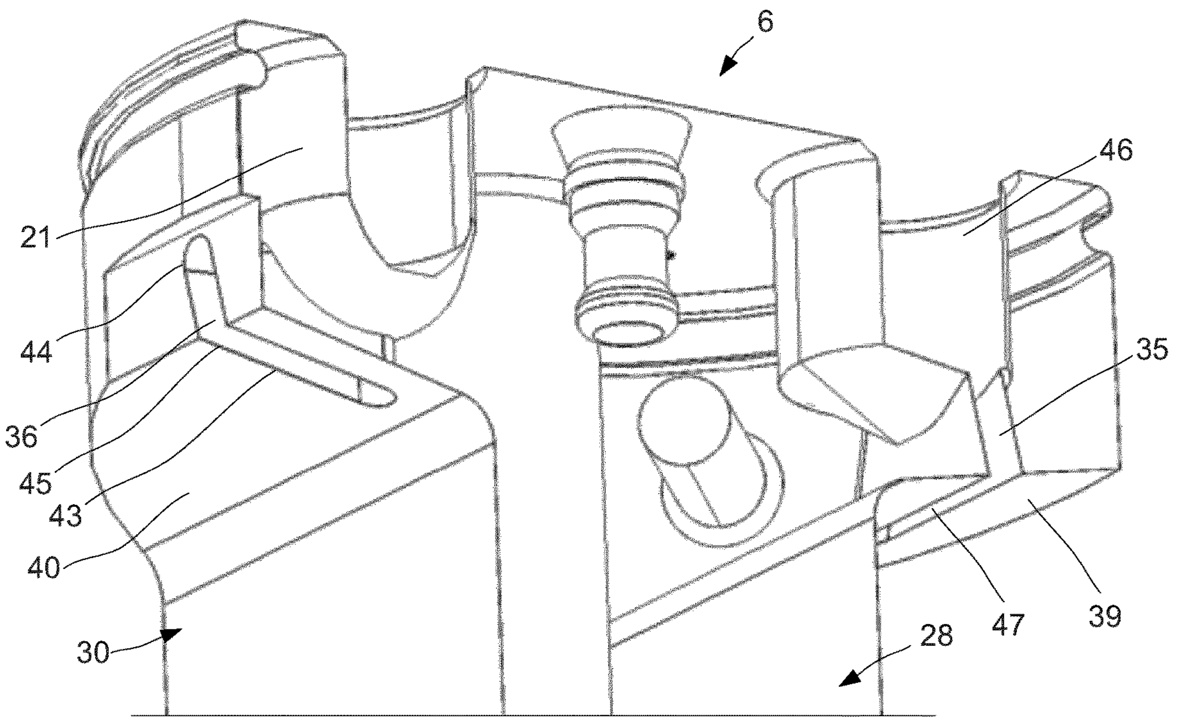
FIG. 8 is a detailed cross-sectional view of the jet nozzle of FIG. 1 showing the shaft spray opening and the door spray opening.

FIG. 8 shows a detailed cross-sectional view of the shaft spray opening 35 and the door spray opening 36. An underside slot 43 of the door spray opening 36 extends along the downwardly directed surface 40 of the second side 30 and a side slot 44 of the door spray opening 36 extends from the underside slot 43 upwardly toward the inlet 21. A flat body 45 of the door spray opening 36 defines the underside slot 43 and the side slot 44 and extends through the cylindrical body 26 to the inlet 21. The widths of the underside slot 43 and the side slot 44 may be uniform along the length of each of the underside slot 43 and the side slot 44. The flat body 45 may be inclined relative to the longitudinal axis L of the jet nozzle 6 (shown in FIG. 5) by an angle that is between 10 and 40 degrees.

The shaft spray opening 35 is defined by a truncated triangular body that extends from another inlet 46 of the jet nozzle 6 through the cylindrical body 26 to the downwardly directed surface 39 of the second side. The truncated triangular shape is configured to provide a fan-shaped spray pattern outwardly from the shaft spray opening 35. In contrast to the door spray opening 36 which includes the side slot 44, the shaft spray opening 35 may have a single underside slot 47 that extends along the downwardly directed surface 39.

Figure 9:
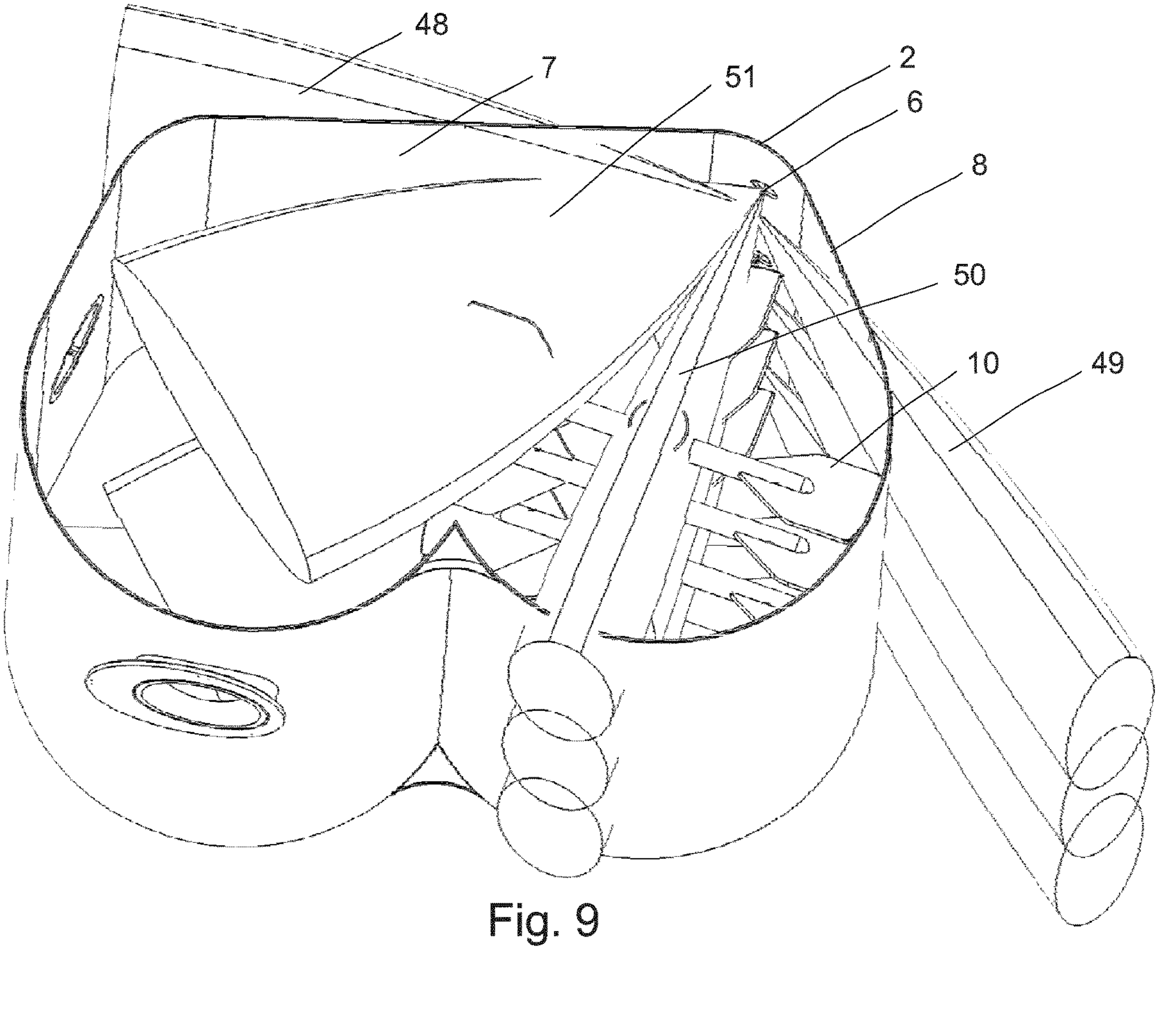
FIG. 9 is a front perspective view of the apparatus of FIG. 1 showing the spray patterns for the jet nozzle.

FIG. 9 shows the different spray patterns provided by the ceiling spray opening 33, the side wall spray opening 34, the shaft spray opening 35, and the door spray opening 36 of the jet nozzle 6. The different spray patterns are directed toward different surfaces of the interior of the container 2 to direct air at the surfaces during the cleaning operation for the powder handling apparatus 1 shown in FIG. 1. The first spray pattern 48 is provided by the ceiling spray opening 33 and is directed toward the ceiling 7. The second spray pattern 49 is provided by the side wall spray opening 34 and is directed toward the side wall 8. The third spray pattern 50 is directed toward the rotatable shaft 9 of the rotatable stirring device 9, 10. The fourth spray pattern 51 is provided by the door spray opening 36 and is directed toward the door 12. As shown in FIG. 9, each spray pattern 48, 49, 50, 51 may be different.

Figure 10:
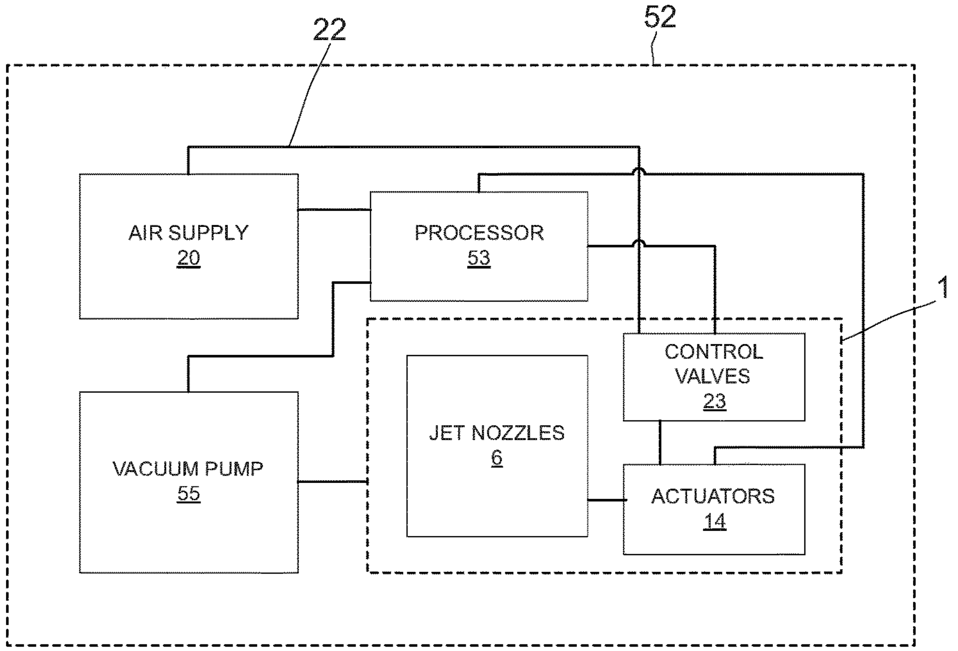
FIG. 10 is a schematic drawing of a control system for the apparatus for handling a food product powder of FIG. 1.

FIG. 10 shows an exemplary control system 52 for the apparatus 1. The cleaning process may be automated using the control system 52 which includes a processor 53 that is communicatively coupled with the control valves 23 and the actuators 14 for activation of the jet nozzles 6. The processor 53 may include any suitable processors and electronic control mechanisms, such as, for example, a central processing unit (CPU), a microprocessor, control circuitry, and the like. The air supply 20 may include a compressor and the control system 52 may control the compressor to feed the air to the supply lines 22 at a predetermined flow rate, e.g. a flow rate that is between 40 and 200 $Nm^3/h$. The control system 52 may be used to maintain constant pressure in the supply lines 22 for the inlets 19, 21 shown in FIGS. 2 and 3.

The control system 52 may also be used to vary the air flow through the jet nozzles 6 to temporarily increase the air flow through the jet nozzles 6. The control system 52 may be used to control the different control valves 23 and vary the air flow through each of the supply lines 22 which correspond to one of the spray openings 33, 34, 35, 36 of the jet nozzle 6. The flowrates at a gauge pressure of 5 barG for the ceiling spray opening 33, the side wall spray opening 34, the shaft spray opening 35, and the door spray opening 36 may be 70 $Nm^3/h$, 70 $Nm^3/h$, 100 $Nm^3/h$, and 100 $Nm^3/h$, respectively. Any predetermined sequence of air flow in the container 2 may be provided using the control system 52. Pulsated air flow, alternating air flow speeds, and different flow rates for different jet nozzles 6 or the inlets 21 of the jet nozzles 6 may be provided.

The processor 53 may be configured to control the actuator 14 shown in FIG. 1 to push the jet nozzle 6 into the volume 4 of the container 2 when product powder is to be removed from the interior surface 3 and retract the jet nozzle 6 when the product powder has been removed from the interior surface 3. In operation, the control valves 23 may be opened after the jet nozzles 6 are pushed into the volume 4 of the container 2 to enable air flow through the spray openings of the jet nozzles 6 into the container 2. A vacuum pump 55 may also be controlled by the processor 53 and fluidly connected to the container 2 for creating a suction effect that draws the air and the powder out of the powder outlet 5 of the container 2 shown in FIG. 1. The vacuum pump 55 may be operable independently from the jet nozzles 6. The container 2 may be enclosed such that air may only exit through the powder outlet 5.

Figure 11:
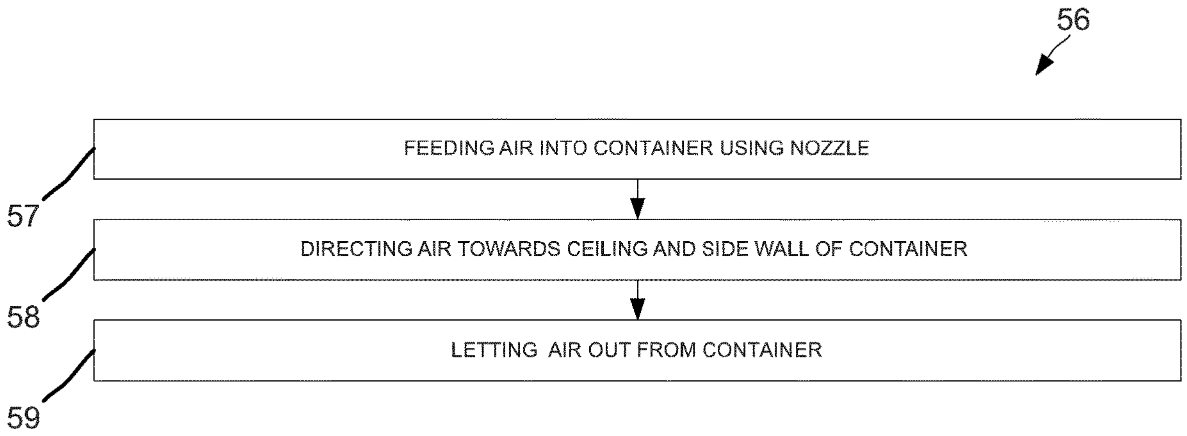
FIG. 11 is a flow chart of a method for cleaning an apparatus for handling a food product powder including the apparatus of FIG. 1.

FIG. 11 shows a method 56 for cleaning an apparatus for handling a food product powder is shown. The apparatus 1 shown in FIG. 1 and the control system 52 shown in FIG. 10 may be used to perform the method 56. The method 56 includes a step 57 of feeding air into the container 2 using the jet nozzles 6 that are attached to the container 2. The air is directed by the jet nozzles 6 towards the interior surface 3 to remove product powder from the interior surface 3. Step 58 of the method 56 includes directing air towards the ceiling 7 of the interior surface 3 using the ceiling spray opening 33 formed on the first side 28 of the jet nozzle 6, and towards the side wall 8 of the interior surface 3 using the side wall spray opening 34 formed on the second side 30 of the jet nozzle 6 opposite the first side 28. Step 59 includes letting air out from the container 2, such that air and the removed product powder may flow out of the container 2 via the powder outlet 5.

The apparatus for handling a food product powder including the jet nozzles is advantageous in providing more efficient cleaning of the apparatus. The jet nozzles in the nozzle arrangement are configured to direct a flow of air at multiple surfaces of the interior surface of the sealable container to remove the residual product powder from the interior surface. The removed product powder and the air may flow out of the container via the powder outlet and a vacuum pump, such that the manual cleaning process for the apparatus may be less intensive or eliminated. In addition to providing a more efficient cleaning process, using the nozzle arrangement advantageously enables a more sanitary cleaning process due to the container being able to remain sealed during the cleaning process.

From the description above follows that, although various embodiments of the invention have been described and shown, the invention is not restricted thereto, but may also be embodied in other ways within the scope of the subject-matter defined in the following claims.

The invention claimed is:

1. An apparatus for handling a food product powder, the apparatus comprising a sealable container having an interior surface defining a volume in which the food product powder is handled, and a powder outlet, and a jet nozzle that is attached to the sealable container and configured to feed air into the sealable container and direct the air towards the interior surface to remove product powder from the interior surface, such that the air and the removed product powder may flow out of the sealable container via the powder outlet, wherein the jet nozzle comprising a ceiling spray opening formed on a first side of the jet nozzle and directed towards a ceiling of the interior surface, and a side wall spray opening formed on a second side of the jet nozzle opposite the first side and directed towards a side wall of the interior surface, and wherein the jet nozzle comprises a cylindrical body that has a first cutout in the first side of the cylindrical body and a second cutout in the second side of the cylindrical body that is opposite the first side.

2. The apparatus according to claim 1, wherein the apparatus is a mixing apparatus that comprises a rotatable stirring device for the food product powder, wherein the jet nozzle includes a shaft spray opening directed towards the rotatable stirring device.

3. The apparatus according to claim 2, wherein the shaft spray opening is configured to provide a fan-shaped spray pattern.

4. The apparatus according to claim 2, wherein the jet nozzle comprises a door spray opening directed towards a door of the sealable container.

5. The apparatus according to claim 4, wherein the door spray opening is inclined relative to a longitudinal axis of the jet nozzle.

6. The apparatus according to claim 1, wherein each of the first cutout and the second cutout comprises, respectively, an upwardly directed surface, a downwardly directed surface and a side surface that extends between the upwardly and downwardly directed surfaces.

7. The apparatus according to claim 6, wherein the ceiling spray opening is formed in the side surface of the first side proximate the upwardly directed surface of the first side, and the side wall spray opening is formed on the side surface of the second side proximate the upwardly directed surface of the second side.

8. The apparatus according to claim 6, wherein the shaft spray opening is formed on the downwardly directed surface of the first side, and wherein the door spray opening is formed on the downwardly directed surface of the second side.

9. The apparatus according to claim 6, wherein the upwardly directed surface is angled relative to the side surface at an angle that is greater than an angle at which the downwardly directed surface is angled relative to the side surface.

10. The apparatus according to claim 1, comprising an actuator configured to push the jet nozzle into the volume defined by the sealable container, when product powder shall be removed from the interior surface, and retract the jet nozzle to a position where an end surface of the jet nozzle is flush with the interior surface of the sealable container, when product powder has been removed from the interior surface.

11. The apparatus according to claim 1, wherein the jet nozzle comprises at least two inlets that are each fluidly connected to an air supply via separate fluid supply lines, each of the two inlets being arranged to feed air to a respective one of the ceiling spray opening and the side wall spray opening.

12. The apparatus according to claim 1, wherein the ceiling spray opening includes a plurality of ceiling spray openings directed in different directions relative to a longitudinal axis of the jet nozzle, and wherein the side wall spray opening includes a plurality of side wall spray openings directed in different directions relative to the longitudinal axis of the jet nozzle.

* * * * *